United States Patent
Becker et al.

(10) Patent No.: US 6,788,947 B2
(45) Date of Patent: Sep. 7, 2004

(54) METHOD FOR SYNCHRONIZATION OF BASE STATIONS WHICH ARE COUPLED TO DIFFERENT SWITCHING SYSTEM PARTS IN A MOBILE RADIO NETWORK

(75) Inventors: Claus-Georg Becker, Berlin (DE); Philipp Nacke, Berlin (DE); Wolfram Eberstein, Berlin (DE); Wolfgang Pusch, Bueren (DE)

(73) Assignee: Siemens Aktiengesellschaft, Munich (DE)

( * ) Notice: Subject to any disclaimer, the term of this patent is extended or adjusted under 35 U.S.C. 154(b) by 456 days.

(21) Appl. No.: 09/998,918

(22) Filed: Dec. 3, 2001

(65) Prior Publication Data

US 2002/0072381 A1 Jun. 13, 2002

(30) Foreign Application Priority Data

Dec. 1, 2000 (DE) .......................................... 100 59 645

(51) Int. Cl.⁷ ................................................ H04B 7/01
(52) U.S. Cl. ........................ 455/502; 455/503; 375/356; 370/324
(58) Field of Search ................................ 455/502, 503; 370/324, 503, 510; 375/149, 354, 355, 356–369

(56) References Cited

U.S. PATENT DOCUMENTS 4,142,069 A * 2/1979 Stover ......................... 370/507
5,519,759 A * 5/1996 Heineck et al. ........... 455/422.1
6,134,439 A * 10/2000 Sipila et al. ................. 455/436
6,167,063 A * 12/2000 Ross .......................... 370/512
6,483,825 B2 * 11/2002 Seta ........................... 370/335
2002/0114354 A1 * 8/2002 Sinha et al. ................. 370/503

FOREIGN PATENT DOCUMENTS

| DE | 43 09 848 A1 | 9/1994 |
| DE | 43 17 895 A1 | 12/1994 |
| DE | 198 18 325 A1 | 10/1999 |
| DE | 198 24 141 A1 | 12/1999 |
| DE | 199 12 556 A1 | 9/2000 |

* cited by examiner

Primary Examiner—Tilahun Gesesse
(74) Attorney, Agent, or Firm—Morrison & Foerster LLP

(57) ABSTRACT

A first base station, which is coupled to a first switching system part is set up within radio range of a second base station, which is coupled to a second switching system part. After initial synchronization of the first base station to the first switching system part and of the second base station to the second switching system part, the second base station receives radio frames transmitted from the first base station and determines their time error with respect to its own radio frame clock. The determined time error is then transmitted to the second switching system part. In response to this, the second switching system part transmits a synchronization signal to the second base station, with the transmission time being chosen as a function of the transmitted time error such that the radio frame clock of the second base station is synchronized with the radio frames of the first base station by time alignment with the synchronization signal.

16 Claims, 2 Drawing Sheets

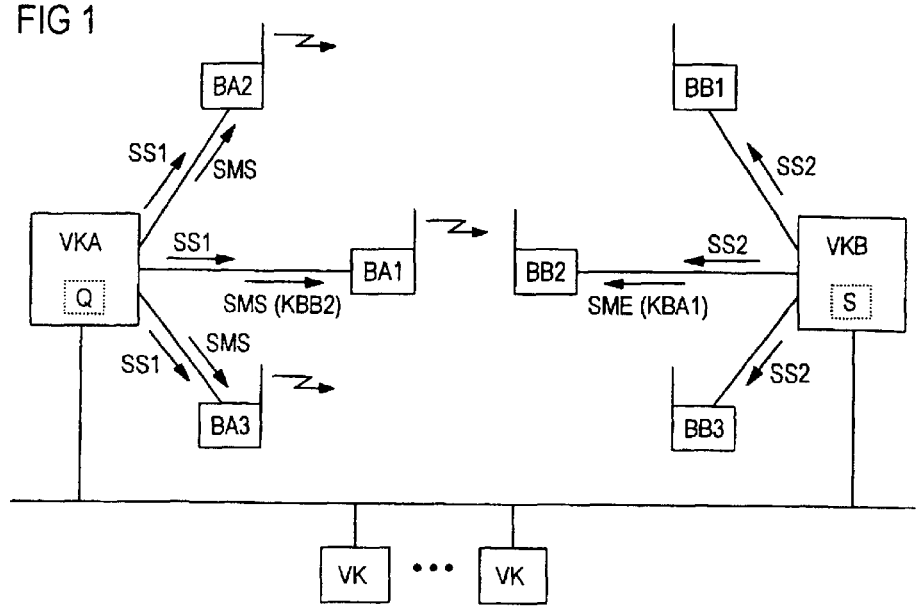
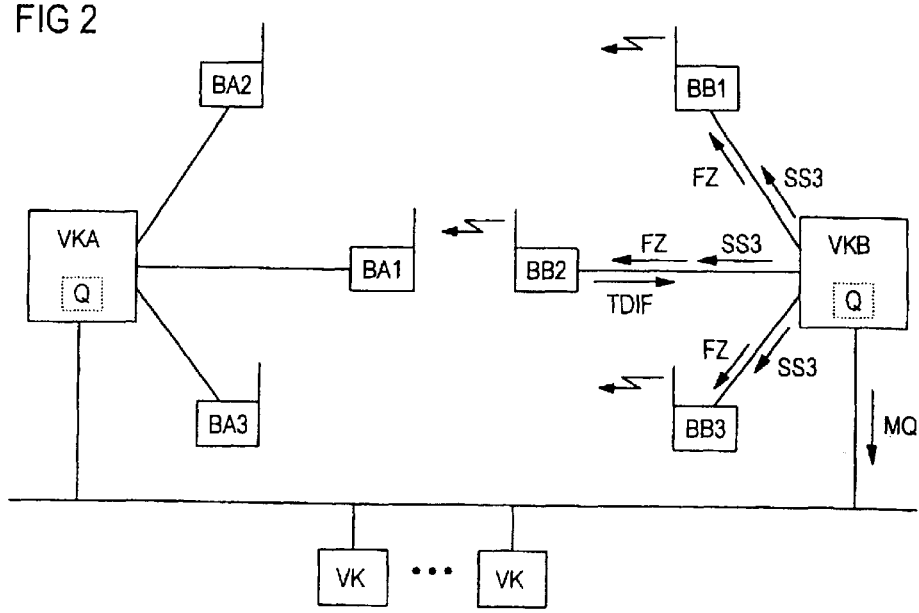

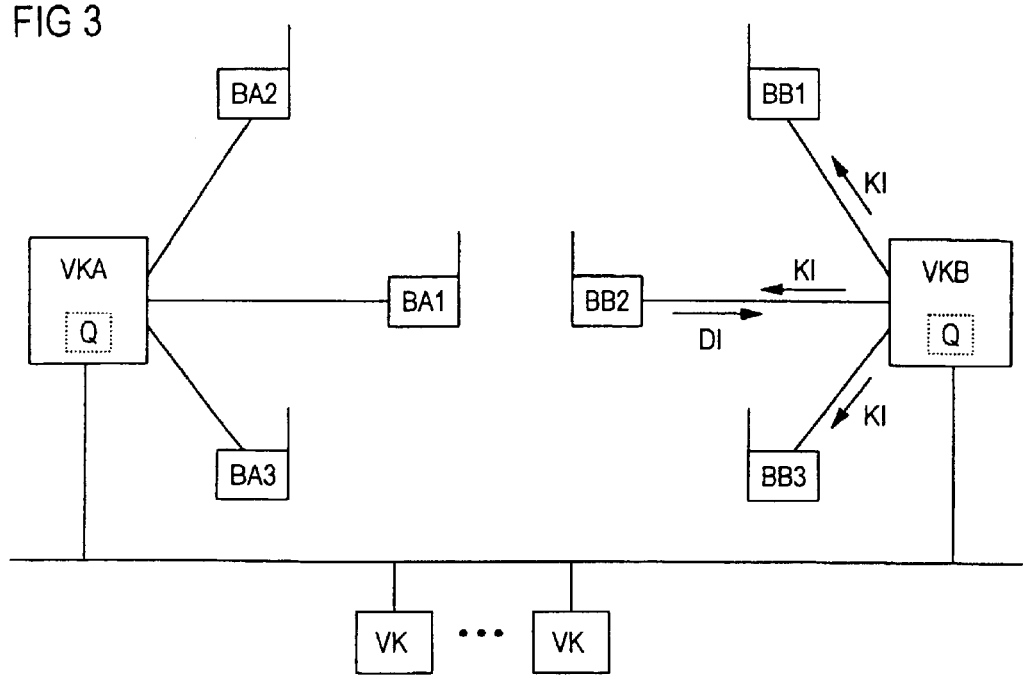

METHOD FOR SYNCHRONIZATION OF BASE STATIONS WHICH ARE COUPLED TO DIFFERENT SWITCHING SYSTEM PARTS IN A MOBILE RADIO NETWORK

CLAIM FOR PRIORITY

This application claims priority to Application No. DE 100 59 645.2 which was published in the German language on Dec. 1, 2000.

TECHNICAL FIELD OF THE INVENTION

The present invention relates to a system and method for synchronizing base stations coupled to switching system parts in a radio network.

BACKGROUND OF THE INVENTION

Present-day communications systems are increasingly communicating in a wireless environment. Terminals in the system may be used for different purposes, such as for transmitting speech, video, fax, data files, programs and/or measurement data. A number of different radio network technologies have been developed for this purpose in different fields of application, such as GSM (Global System for Mobile Communication) and DECT (Digital Enhanced Cordless Telephony). Generally, mobile terminals are wirelessly linked via one or more base stations, which are themselves connected to switching devices or switching system parts.

In order to supply a larger area with wireless connection capabilities, a number of base stations are generally distributed over the area. The base stations have radio cells which form a mobile radio network covering the area. A subscriber can move freely within the area of coverage, and an existing connection can be passed on without any interruption from one radio cell to the next, or from one base station to the next base station. A change in the connection routing without any interruption (i.e. No interruption perceived by the subscriber) between base stations is referred to as a seamless handover.

In DECT systems, carrying out such a seamless handover places very stringent requirements on the synchronicity of the base stations involved. For example, adjacent base stations in a DECT mobile radio network must maintain a frequency accuracy of at least +/−5 ppm for a correct seamless handover procedure. Furthermore, they must keep their respective radio frames (10 ms) and radio superframes (600 ms and 800 ms) synchronized to one another. The mutual error between the radio frames must not exceed +/1.8 microseconds.

In distributed mobile radio networks which have a number of switching system parts, the required synchronicity can be ensured only with considerable additional complexity. Thus, for example, mobile radio networks that are currently being developed provide for each switching system part to be externally supplied with high-precision frequency and time information via a GPS receiver (Global Positioning System) in order to produce synchronicity between DECT base stations covering switching nodes. However, the required GPS receiver represents a considerable additional cost factor.

SUMMARY OF THE INVENTION

In one embodiment of the invention, there is a method for synchronization of base stations in a mobile radio network. The method comprises, for example, transmitting a first synchronization signal from a first switching system part, causing a first base station, coupled thereto, to transmit radio frames which are aligned in time with the first synchronization signal, and transmitting a second synchronization signal from a second switching system part, causing a second base station, coupled thereto, to align its radio frame clock with the second synchronization signal, wherein the second base station receives the transmitted radio frames and determines a time error with respect to the radio frame clock, and transmits the time error to the second switching system part, and the second switching system part transmits a third synchronization signal to the second base station, with a transmission time selected as a function of the transmitted time error such that the radio frame clock of the second base station is synchronized with the radio frames of the first base station by time alignment with the third synchronization signal.

In one aspect of the invention, when selecting the transmission time for the third synchronization signal, a delay time between the second switching system part and the second base station is taken into account as a compensating factor.

In another aspect of the invention, the first and the second synchronization signals are each transmitted during startup of the first and second switching system parts, respectively.

In still another aspect of the invention, during startup of the first and the second switching system parts, the first switching system part is configured as a synchronization source, and the second switching system part is configured as a synchronization sink.

In another aspect of the invention, the first base station is configured by the synchronization source as a radio frame transmitter, and the second base station is configured by the synchronization sink as a radio frame receiver.

In another aspect of the invention, the second switching system part transmits an identifier for the first base station to the second base station, and the second base station uses the transmitted identifier to selectively receive the radio frames from the first base station.

In yet another aspect of the invention, when the second base station has been synchronized, the second switching system part is configured as a synchronization source for additional switching system parts in the mobile radio network.

In another aspect of the invention, the second base station uses radio frames received during operation to determine a drift in the radio frame clock of the second base station, and transmits drift information to the second switching system part, and the second switching system part uses the transmitted drift information to derive correction information and transmits the information to at least one additional base station, which is coupled to the second switching system part and readjusts the radio frame clock of the base station on the basis of the transmitted correction information.

In another embodiment of the invention, there is a system for synchronization of base stations in a mobile radio network. The system includes, for example, a first switching system part, to transmit a first synchronization signal, causing a first base station, coupled to the first switching system part, to transmit radio frames which are aligned in time with the first synchronization signal, and a second switching system part to transmit a second synchronization signal, causing a second base station, coupled to the second switching system, to align its radio frame clock with the second synchronization signal, wherein the second base station receives the transmitted radio frames and determines a time error with respect to the radio frame clock, and transmits the time error to the second switching system part, and the second switching system part transmits a third synchronization signal to the second base station, with a transmission time selected as a function of the transmitted time error such that the radio frame clock of the second base station is synchronized with the radio frames of the first base station by time alignment with the third synchronization signal.

In one aspect of the invention, when selecting the transmission time for the third synchronization signal, a delay time between the second switching system part and the second base station is taken into account as a compensating factor.

In another aspect of the invention, the first and the second synchronization signals are each transmitted during startup of the first and second switching system parts, respectively.

In still another aspect of the invention, during startup of the first and the second switching system parts, the first switching system part is configured as a synchronization source, and the second switching system part is configured as a synchronization sink.

In another aspect of the invention, the first base station is configured by the synchronization source as a radio frame transmitter, and the second base station is configured by the synchronization sink as a radio frame receiver.

In another aspect of the invention, the second switching system part transmits an identifier for the first base station to the second base station, and the second base station uses the transmitted identifier to selectively receive the radio frames from the first base station.

In yet another aspect of the invention, when the second base station has been synchronized, the second switching system part is configured as a synchronization source for additional switching system parts in the mobile radio network.

In another aspect of the invention, the second base station uses radio frames received during operation to determine a drift in the radio frame clock of the second base station, and transmits drift information to the second switching system part, and the second switching system part uses the transmitted drift information to derive correction information and transmits the information to at least one additional base station, which is coupled to the second switching system part and readjusts the radio frame clock of the base station on the basis of the transmitted correction information.

BRIEF DESCRIPTION OF THE DRAWINGS

The invention will be explained in more detail in the following text using the example of a DECT mobile radio network and with reference to the drawings.

FIG. 1, FIG. 2 and FIG. 3 show a DECT mobile radio network with a number of switching nodes, in successive method phases.

DETAILED DESCRIPTION OF THE PREFERRED EMBODIMENTS

The present invention describes a method for a mobile radio network, where the base stations are coupled to different switching system parts which can be synchronized in a simple manner.

It is readily understood that the sequence of the method of the present invention need not be carried out in the time sequence as recited in the claims.

The present invention allows synchronization of base stations which are coupled to different switching system parts, for example to different switching devices or network nodes in a communications network. For this purpose, a second base station, which is coupled to a second switching system part, is set up within radio range of a first base station, which is coupled to a first switching system part. After initial synchronization of the first base station to the first switching system part, and of the second base station to the second switching system part, the second base station receives radio frames transmitted from the first base station, and uses their time error to determine its own radio frame clock. This time error is transmitted from the second base station, for example in the form of error or delay information which indicates, for example, a time, bit, timeslot, radio frame and/or radio superframe offset, to the second switching system part. In response to this, the second switching system part transmits a third synchronization signal to the second base station. In this case, a transmission time is chosen as a function of the transmitted time error such that the radio frame clock of the second base station is synchronized with the radio frames of the first base station by time alignment with the third synchronization signal.

In addition to being transmitted to the first or second base station, the specified synchronization signals may, if required, also be transmitted to additional base stations which are coupled to the first or second switching system part. These additional base stations are thus each synchronized with the first or second base station. The additional base stations are thus synchronized with one another, following the synchronization according to the invention between the first and the second base stations.

An advantage of the method according to the invention is that no additional circuit or hardware complexity is required for synchronization of base stations covered by different switching system parts. Furthermore, no complex signaling traffic is required between the different switching system parts in order to carry out the synchronization process.

The transmission of synchronization signals allows the radio frames and radio frame clocks to be aligned in time in a considerably more flexible manner than, for example, by transmitting clock control information. A transmitted synchronization signal defines a precise time with respect to which, for example, the transmission start of a radio frame, radio superframe, timeslot and/or bit, and a starting time or reset time for a counter, can be oriented. In particular, a synchronization signal also allows an initially uncorrelated radio frame clock to be synchronized directly.

Furthermore, a synchronization signal also allows counters for radio superframes to be set, reset or initiated in a manner covering a number of radio frames. The method according to the invention thus allows both the radio frames and the radio superframes of base stations to be synchronized in a standard manner. This represents a major advantage, particularly in the case of DECT base stations.

According to one advantageous embodiment of the invention, when choosing the transmission time for the third synchronization signal, the delay time between the second switching system part and the second base station is taken into account as a compensating factor. For this purpose, the signal delay times between the second switching system part and the base stations connected to it can be measured first, before transmitting a synchronization signal. Delay information can then be derived from each of the measured delay times, and is transmitted to the relevant base station. The base stations can then delay subsequently received synchronization signals as a function of the respectively transmitted delay information. A respective delay is produced by compensating for individual differences in the signal delay time between the base stations and the second switching system part. This considerably improves the synchronization accuracy.

Furthermore, the transmission time of a synchronization signal by the second switching system part can be advanced as a function of a measured signal delay time, in order to compensate for this signal delay time.

In addition to being measured in the second switching system part, the signal delay times to each of the coupled base stations can also be measured in the first, and other, switching system parts in the mobile radio network, and can be taken into account as a compensating factor when transmitting and/or receiving synchronization signals.

According to another advantageous embodiment of the invention, the first and the second synchronization signal can each be transmitted during the startup of the relevant first or second switching system part. The first switching system part can also be configured as a synchronization source (master), and the second switching system part can be configured as a synchronization sink, when starting up a number of switching system parts. The system administration preferably defines which switching system parts will be configured as the synchronization source during startup. Configuration during startup avoids the otherwise necessary, complex negotiation of the synchronization sequence between the individual switching system parts.

The switching system part which is configured as the synchronization source can preferably configure one or more base stations, which are coupled to it, as a radio frame transmitters. In a corresponding way, a switching system part which is configured as a synchronization sink can configure one or more base stations, which are coupled to it, as radio frame receivers. The transmission and reception of radio frames can in this case be initiated, for example, by a respective synchronization signal.

According to another advantageous embodiment of the invention, the second base station can use radio frames received during operation to determine any drift in its own radio frame clock, and to transmit drift information to the second switching system part. The second switching system part can use the transmitted drift information to derive correction information, and to transmit this to one or more coupled base stations. The base stations can then use the transmitted correction information to readjust their radio frame clock, in order to ensure or reproduce their synchronicity with the received radio frames. This allows avoiding or compensating for, for example, temperature-dependent drift in the radio frame clock.

FIGS. 1, 2 and 3 each show the same DECT mobile radio network (DECT: Digital Enhanced Cordless Telephony), in schematic form. The DECT mobile radio network has a switching node VKA as the first switching system part, a switching node VKB as the second switching system part, and a number of further switching nodes VK. The switching nodes VKA, VKB, VK are connected to one another via a communications network, such as a local area network (LAN) or a wide area network (WAN). The switching node VKA is connected to DECT base stations BA1, BA2 and BA3, which form a multicell radio network. In a corresponding way, the switching node VKB is connected to DECT base stations BB1, BB2 and BB3, which likewise form a multicell radio network. The base stations BA1 and BB2 are set up a distance apart from one another, so that they are located within radio range of each other.

FIG. 1 shows the DECT mobile radio network in a first method phase, during startup of the switching nodes VKA and VKB. During startup, the switching node VKA is configured as a synchronization source Q, and while it is being started up, the switching node VKB is configured as a synchronization sink S. The information as to which switching node is configured as the synchronization source Q and which is configured as the synchronization sink S during the startup is preferably stored in advance by the administration in the switching nodes.

During startup, the switching node VKA which is configured as the synchronization source Q transmits a control message SMS to the base stations BA1, BA2 and BA3. The control message SMS initializes the base stations BA1, BA2 and BA3 during the DECT normal mode, in which the base stations BA1, BA2 and BA3 can be caused to transmit radio frames on receiving a synchronization signal. The switching node VKA then transmits such a synchronization signal SS1 to the connected base stations BA1, BA2 and BA3, causing them to transmit radio frames which are aligned in time with the received synchronization signal SS1. The synchronization signal SS1 synchronizes the base stations BA1, BA2 and BA3 to one another. The transmission of radio frames is in each case indicated by a stylized lightning flash in FIG. 1.

During the startup of the switching node VKB, which is configured as the synchronization sink S, it transmits a control message SME to the base station BB2. The control message SME is used to transmit an identifier KBA1, which identifies the base station BA1, to the base station BB2. The control message SME results in the base station BB2 being initialized during the DECT mobile part mode, in which the base station BB2 tries to receive radio frames from a base station, in this case BA1, which is identified by the transmitted identifier KBA1. After the transmission of the control message SME, the switching node VKB transmits a synchronization signal SS2 to the connected base stations BB1, BB2 and BB3. The transmitted synchronization signal SS2 causes the base stations BB1, BB2 and BB3 to align each of their radio frame clocks in time with the received synchronization signal SS2. The base stations BB1, BB2 and BB3 are thus synchronized with one another. The base station BB2 then changes to the reception mode and, in the present example, receives the radio frames transmitted by the base station BA1. The base station BB2 then determines the time error between the received radio frames and its own radio frame clock.

The control message SMS can preferably also be used to transmit an identifier KBB2, which identifies the base station BB2, to the base station BA1. The identifier KBB2 identifies the base station BA1 to that base station, in this case BB2, which is receiving the radio frames from the base station BA1 for synchronization purposes. The mutual identification of the synchronization partners, in this case BA1 and BB2, allows for identification of any possible failure of a synchronization partner, at both ends. If a failure is identified, suitable counter measures can be initiated, for example, searching for a new synchronization partner and/or changing between the transmission and reception modes.

The subsequent method phases of the exemplary embodiment are illustrated in FIG. 2.

The determined time interval between the transmitted radio frames and the radio frame clock in the base station BB2 is transmitted in the form of error information TDIF from the base station BB2 to the switching node VKB. The error information TDIF in the present exemplary embodiment, indicates the bit offset within a radio frame, and the radio frame offset within a radio superframe. The switching node VKB uses the transmitted radio frame offset to determine a radio frame count FZ, which corresponds to the position of the next radio frame to be transmitted by the base station BA1 within its radio superframe. The determined radio frame count FZ is then transmitted to the connected base stations BB1, BB2 and BB3 in order to set a respective radio frame counter (not illustrated) to this radio frame count FZ there. The switching node VKB then transmits a synchronization signal SS3 to the connected base stations BB1, BB2 and BB3. The transmission time is in this case selected by the switching node VKB as a function of the transmitted error information TDIF, such that the radio frame clocks of each of the base stations BB1, BB2 and BB3 are synchronized, by time alignment with the synchronization signal SS3, with the radio frames transmitted from the base station BA1. The delay time of the synchronization signal SS3 is preferably also taken into account, as a compensating factor, when choosing the transmission time. The synchronization signal SS3 also causes the radio frame counters in the base stations BB1, BB2 and BB3 to be started from the transmitted radio frame count FZ. In this way, the base stations BB1, BB2 and BB3 are synchronized both with one another and with the base stations BA1, BA2 and BA3; to be precise with respect to their radio superframes.

The synchronization signals SS1, SS2 and/or SS3 can preferably be formed by T bits, which are frequently used as flow-control signals on $OP_0$ lines.

In response to the synchronization signal SS3, the base stations BB1, BB2 and BB3 start to transmit synchronized radio frames, change to the DECT normal mode, and are available for setting up connections to mobile terminals (not illustrated). The radio frames transmitted by the base stations BB1, BB2 and BB3 are indicated by stylized lightning flashes in FIG. 2.

Furthermore, after successful synchronization, the switching node VKB is reconfigured to be the synchronization source Q, as illustrated by the dotted rectangle in FIG. 2. In response, the switching node VKB transmits a message MQ to the switching nodes VKA and VK that are networked with it in the DECT mobile radio network, indicating that that switching node VKB is now available as a synchronization source Q. As an alternative to this, the base stations BB1, BB2 and BB3 which are connected to the switching node VKB can signal, after successful synchronization, over their radio area that they are available as synchronization sources.

FIG. 3 shows the DECT mobile radio network after readjustment of the radio frame clocks in the base stations BB1, BB2 and BB3 during operation. Readjustment of the radio frame clocks may be necessary when system clock generators (not illustrated) in the base stations BB1, BB2 or BB3 or in the switching node VKB are subject to frequency drift, for example due to temperature influences. In order to determine such drift, the base station BB2 measures the extent to which its own radio frame clock has shifted in time, during a measurement time interval of, for example, one second, with respect to the radio frames received from the base station BA2. The measurement result is used to derive drift information DI, which is transmitted to the switching node VKB. The drift information DI may in this case indicate, for example, how many system clock cycles, bit clock cycles or microseconds its own radio frame clock has drifted with respect to the radio field of the base station BA1 during the measurement time interval. The switching node VKB uses the transmitted drift information DI to determine correction information KI, and transmits this to the connected base stations BB1, BB2 and BB3. The transmitted correction information KI causes the base stations BB1, BB2 and BB3 to readjust their respective radio frame clocks so that they are once again bit-synchronized with the radio field of the base station BA1. The readjustment process is carried out autonomously by the base stations, so that there is no need for any further message traffic between the base stations BB1, BB2 and BB3, and the switching node VKB. There is likewise no need for any additional message traffic between the switching nodes VKB and VKA. The readjustment of the radio frame clocks in each of the base stations BB1, BB2 and BB3 may be carried out as a function of the transmitted correction information KI, for example by every n-th radio frame being lengthened or shortened by one bit. The variable n is in this case chosen as a function of the correction information KI. Such correction of individual radio frames may be carried out iteratively at lengthening time intervals. The correction intervals may preferably be chosen to be inversely proportional to the magnitude of the measured time error, that is to say the drift rate.

The measurement of the drift rate is preferably repeated at predetermined time intervals, in order in this way to ensure synchronicity between all the base stations BA1, BA2, BA3, BB1, BB2 and BB3 throughout their operation.

What is claimed is:

1. A method for synchronization of base stations in a mobile radio network, comprising:

transmitting a first synchronization signal from a first switching system part, causing a first base station, coupled thereto, to transmit radio frames which are aligned in time with the first synchronization signal; and transmitting a second synchronization signal from a second switching system part, causing a second base station, coupled thereto, to align its radio frame clock with the second synchronization signal, wherein the second base station receives the transmitted radio frames and determines a time error with respect to the radio frame clock, and transmits the time error to the second switching system part, and the second switching system part transmits a third synchronization signal to the second base station, with a transmission time selected as a function of the transmitted time error such that the radio frame clock of the second base station is synchronized with the radio frames of the first base station by time alignment with the third synchronization signal.

2. The method as claimed in claim 1, wherein when selecting the transmission time for the third synchronization signal, a delay time between the second switching system part and the second base station is taken into account as a compensating factor.

3. The method as claimed in claim 1, wherein the first and the second synchronization signals are each transmitted during startup of the first and second switching system parts, respectively.

4. The method as claimed in claim 1, wherein during startup of the first and the second switching system parts, the first switching system part is configured as a synchronization source, and the second switching system part is configured as a synchronization sink.

5. The method as claimed in claim 4, wherein the first base station is configured by the synchronization source as a radio frame transmitter, and the second base station is configured by the synchronization sink as a radio frame receiver.

6. The method as claimed in claim 5, wherein the second switching system part transmits an identifier for the first base station to the second base station, and the second base station uses the transmitted identifier to selectively receive the radio frames from the first base station.

7. The method as claimed in claim 1, wherein when the second base station has been synchronized, the second switching system part is configured as a synchronization source for additional switching system parts in the mobile radio network.

8. The method as claimed in claim 1, wherein the second base station uses radio frames received during operation to determine a drift in the radio frame clock of the second base station, and transmits drift information to the second switching system part, and the second switching system part uses the transmitted drift information to derive correction information and transmits the information to at least one additional base station, which is coupled to the second switching system part and readjusts the radio frame clock of the base station on the basis of the transmitted correction information.

9. A system for synchronization of base stations in a mobile radio network, comprising:

a first switching system part, to transmit a first synchronization signal, causing a first base station, coupled to the first switching system part, to transmit radio frames which are aligned in time with the first synchronization signal; and a second switching system part to transmit a second synchronization signal, causing a second base station, coupled to the second switching system, to align its radio frame clock with the second synchronization signal, wherein the second base station receives the transmitted radio frames and determines a time error with respect to the radio frame clock, and transmits the time error to the second switching system part, and the second switching system part transmits a third synchronization signal to the second base station, with a transmission time selected as a function of the transmitted time error such that the radio frame clock of the second base station is synchronized with the radio frames of the first base station by time alignment with the third synchronization signal.

10. The system as claimed in claim 9, wherein when selecting the transmission time for the third synchronization signal, a delay time between the second switching system part and the second base station is taken into account as a compensating factor.

11. The system as claimed in claim 9, wherein the first and the second synchronization signals are each transmitted during startup of the first and second switching system parts, respectively.

12. The system as claimed in claim 11, wherein during startup of the first and the second switching system parts, the first switching system part is configured as a synchronization source, and the second switching system part is configured as a synchronization sink.

13. The system as claimed in claim 12, wherein the first base station is configured by the synchronization source as a radio frame transmitter, and the second base station is configured by the synchronization sink as a radio frame receiver.

14. The system as claimed in claim 13, wherein the second switching system part transmits an identifier for the first base station to the second base station, and the second base station uses the transmitted identifier to selectively receive the radio frames from the first base station.

15. The system as claimed in claim 9, wherein when the second base station has been synchronized, the second switching system part is configured as a synchronization source for additional switching system parts in the mobile radio network.

16. The system as claimed in claim 9, wherein the second base station uses radio frames received during operation to determine a drift in the radio frame clock of the second base station, and transmits drift information to the second switching system part, and the second switching system part uses the transmitted drift information to derive correction information and transmits the information to at least one additional base station, which is coupled to the second switching system part and readjusts the radio frame clock of the base station on the basis of the transmitted correction information.

* * * * *